Oct. 25, 1966    R. R. LUKE ET AL    3,281,778
SEISMOMETER

Filed Sept. 28, 1964    2 Sheets-Sheet 1

INVENTORS:
R. R. LUKE
M. M. ROBINSON
BY: *Theodore E. Bieber*
THEIR ATTORNEY

Oct. 25, 1966   R. R. LUKE ET AL   3,281,778
SEISMOMETER

Filed Sept. 28, 1964   2 Sheets-Sheet 2

INVENTORS:
R. R. LUKE
M. M. ROBINSON
BY: *Theodore E. Bieber*
THEIR ATTORNEY

United States Patent Office 3,281,778
Patented Oct. 25, 1966

3,281,778
SEISMOMETER
Robert R. Luke, Houston, and Marshall M. Robinson, Sugar Land, Tex., assignors to Shell Oil Company, New York, N.Y., a corporation of Delaware
Filed Sept. 28, 1964, Ser. No. 399,676
7 Claims. (Cl. 340—17)

This invention pertains to seismometers and, more particularly, to a seismometer having a very low frequency response.

Very low frequency motion-sensitive seismometers are particularly useful in respect to earth motions having frequencies below those generally employed in exploratory seismology. For example, they are used to detect the occurrence of earthquakes or large explosions as, for example, nuclear explosions. In order for a motion-sensitive seismometer to give a satisfactory result under various conditions, it must have good low-frequency response. Normally it is required that the seismometer respond to frequencies as low as one cycle per second. Earth motions such as earthquakes, in addition to being relatively low frequency are also relatively weak, and thus the seismometers must be extremely sensitive.

Accordingly, the principal object of this invention is to provide a motion-sensitive seismometer which is extremely sensitive to low frequencies on the order of one cycle per second.

A further object of this invention is to provide a low-frequency motion-sensitive seismometer that incorporates a negative spring in parallel with a positive spring to provide improved low frequency response.

The above objects and advantages of this invention are achieved by providing a movable mass supported by the combination of a negative spring in parallel with a positive spring. The term "negative spring" is used to refer to a spring whose characteristics are such that it has a negative force deflection gradient. Expressed in another way, a negative spring tends to assist or amplify any motion of the mass instead of resisting the motion of the mass as would a normal spring. In addition, the seismometer, by incorporating the parallel negative and positive springs, may be sensitive to either vertical or horizontal motion. The motion of the seismometer and the motion of the suspended mass is, if course, converted to a related electrical signal by means of a pickup coil and permanent magnet as is conventional in the seismometer art.

The above objects and advantages of this invention will be more easily understood by those skilled in the art from the following detailed description of preferred embodiments when taken in conjunction with the attached drawings in which.

Figure 1:
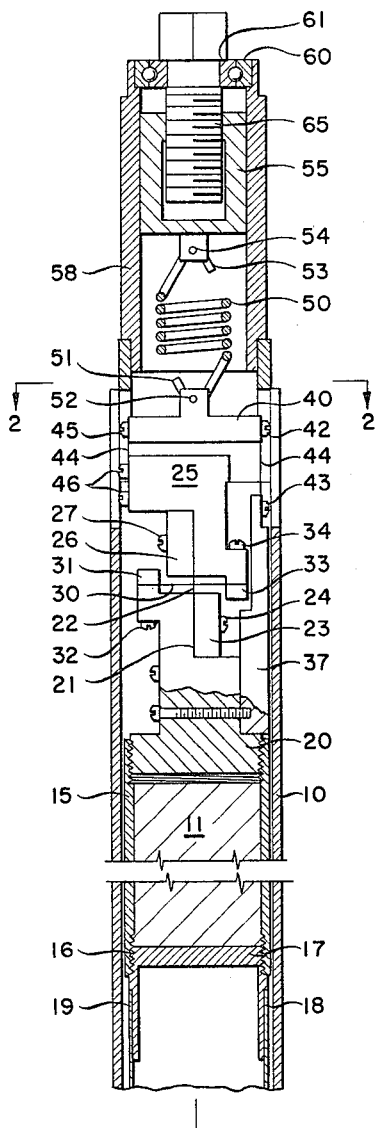
FIGURE 1 is a vertical section of a seismometer constructed in accordance with this invention and sensitive to horizontal motion.
Figure 3:
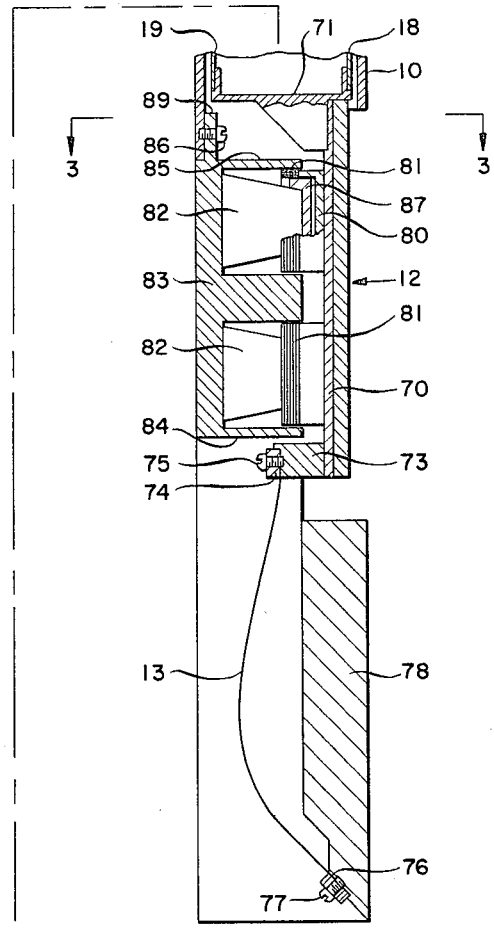
FIGURE 3 is a horizontal cross-section taken along line 3—3 of FIGURE 1.
Figure 2:
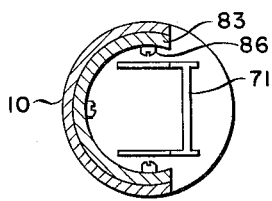
FIGURE 2 is a horizontal cross-section taken along line 2—2 of FIGURE 1.
Figure 2:
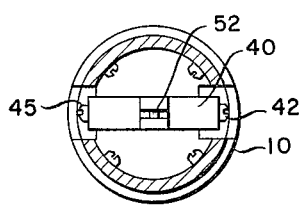

Referring now to FIGURES 1, 2 and 3, there is shown a seismometer constructed in accordance with this invention and sensitive to horizontal motion. The seismometer is constructed on a basic frame or housing 10. The housing or frame 10 has a general cylindrical shape and extends for substantially the complete length of the seismometer. Of course, the frame is provided with numerous cutouts, projections, and recesses to permit mounting of the various elements of the seismometer. The horizontal motion is detected by means of the mass 11 that is pivotally suspended at the upper end and carries the detecting coil assembly 12 at its lower end. In addition, the lower end of the coil assembly is supported by a negative spring 13 while the upper end of the pivoted mass is supported by means of positive springs as will be described below.

The mass 11 is formed of a tubular outer shell 15 which may be filled with any suitable material to supply the required mass. For example, suitable filling materials may be molded lead or other low-melting point alloys. The lower end of the tubular outer shell 15 of the mass 11 is coupled by means of a threaded connection to a composite lower coil supporting frame 17. The coil supporting frame 17 may consist of two arms 18 and 19 that extend downwardly from the threaded mounting. The upper end of the tubular outer shell 15 of the mass 11 is closed by a threaded end closure 20. The end closure 20 is provided with a flat vertical surface 21 at its proper end, with the surface 21 being aligned with the longitudinal axis of the mass 11. A flat pivot spring 22 is clamped to the surface 21 by means of a plate 23 and a machine screw 24 that passes through the plate 23 and threads into the end member 20. The upper end of the pivot spring 22 is clamped against a similar vertical surface formed on a spring supporting member 25 by a plate 26 and machine screws 27. The pivot connection for the upper end of the mass 11 is completed by a horizontal pivot spring 20. The two pivot springs 22 and 30 are formed of flat resilient material, as for example, phosphorus bronze or the like. The left-hand end of the horizontal pivot spring 30 is retained on the end of closure 20 by means of a plate 31 and machine screw 32. Similarly, the right-hand end of the horizontal pivot spring 30 is clamped to the spring support 25 by means of a plate 33 and machine screw 34. The two spring members 22 and 30 are designed so that they pass through each other and thus form a pivot for the mass 11 at their intersection. The pivotal support provided by the two springs has substantial zero friction and the mass will be free to respond to any horizontal movement.

The upper spring support 25 is coupled to a centering spring support 40 by means of two flat springs 41 and 44. The spring 41 clamps to an extension 37 that extends upwardly from the end closure 20. The lower end of the spring 41 is clamped to the member 37 by means of a small machine screw 43 while the upper end of the spring 41 is similarly clamped to the centering spring support 40 by means of machine screw 42. The left-hand spring 44 is similarly clamped to the spring support 25 by means of two machine screws 46 while its upper end is clamped to the centering spring support 40 by means of a machine screw 45.

The complete mass, supporting springs and pick up coil assembly, is suspended at the top from a centering spring 50. The lower end 51 of the centering spring 50 is secured to the centering spring support 40 by means of a small pin 52. The upper end 53 of centering spring 50 is similarly retained in an adjustable member 55 by means of pin 54. The member 55 is provided with a threaded opening at its upper end in which threaded stud 65 fits. The combination of the stud and the adjustable member 55 provides a means by which the tension on the centering spring 50 can be either increased or decreased. As explained below, the movable mass 11 and coil assembly 12 may be raised or lowered to center the coils over the permanent magnets. It is necessary to adjust the position of the coils to compensate for temperature changes. The stud member 56 is supported by an outwardly extending shoulder 61 that rests on the inner race of a ball bearing 60. The stud 56 can be driven by any suitable means, for example an electric motor (not shown in FIGURE 1), in order that the seismometer may be remotely controlled.

The two arms 18 and 19 extend longitudinally from the lower end of the mass 11 and are fastened to a bracket 71 that supports the coil frame 70. The lower end of the frame 70 is supported by the upper end of the negative spring 13. The end of the negative spring 13 is clamped between the projection 73 and a plate 74 by machine screws 75. It should be noted that the vertical surface of the projection 73 to which the negative spring is clamped is substantially aligned with the vertical surface 21 of the upper end closure 22. The lower end of the negative spring 13 is clamped between a portion 78 of the outer housing 10 and a plate 76, by machine screws 77.

The coil assembly consists of two cup-shaped coil supports 80 mounted on the coil supporting member 70. Positioned on the outer cylindrical surface of each of the coil forms are suitable coils 81. Coils 81 are formed of a few turns of very fine wire and may be wrapped on a separate coil form and inserted over the cup-shaped members or in the alternative may be mounted directly on the outer surfaces of the cup-shaped members. Cup-shaped members 80 are preferably formed of a conducting nonmagnetic material, as for example, aluminum. A magnet support 83 is fastened to the tubular main frame 10 by means of a series of machine screws 86. The magnet support 83 is provided with two permanent magnets 82 positioned in recesses formed in the magnet support and mounted to project into the cup-shaped coil supports 80. In addition, each of the magnets is provided with an end or pole piece 87 to improve the magnetic coupling between the permanent magnets 82 and the coils 81. The magnetic support 83 is provided with end poles 84 and 85 that extend to a position adjacent the coils 81.

When the above seismometer is operated, it is first lowered into a well. After the seismometer is located, the stud 56 is rotated and the tension of the centering spring 50 is adjusted to provide sufficient tension on the system to center the coils. The seismometer will then respond to any slight horizontal movement of the mass 11 which is magnified as a result of the negative spring 13 while the horizontal movement is resisted by the normal springs 41 and 44 that are disposed in parallel with the negative spring 13. The combination of the negative spring 13 in parallel with the two springs 41 and 44 insure that the seismometer will respond to movements of very low frequency on the order of 1 cycle per second. Further, the use of the vertical and horizontal springs 21 and 30 for forming a pivot for the mass 11 provides a substantially frictionless pivot, thus improving the response of the seismometer to very low amplitude movements. While the centering spring 50 is in parallel with the spring system comprising negative spring 13 and positive springs 41 and 44, the frequency of spring 50 is much higher. Thus spring 50 has substantially no effect on the response of the system.

Figure 4:
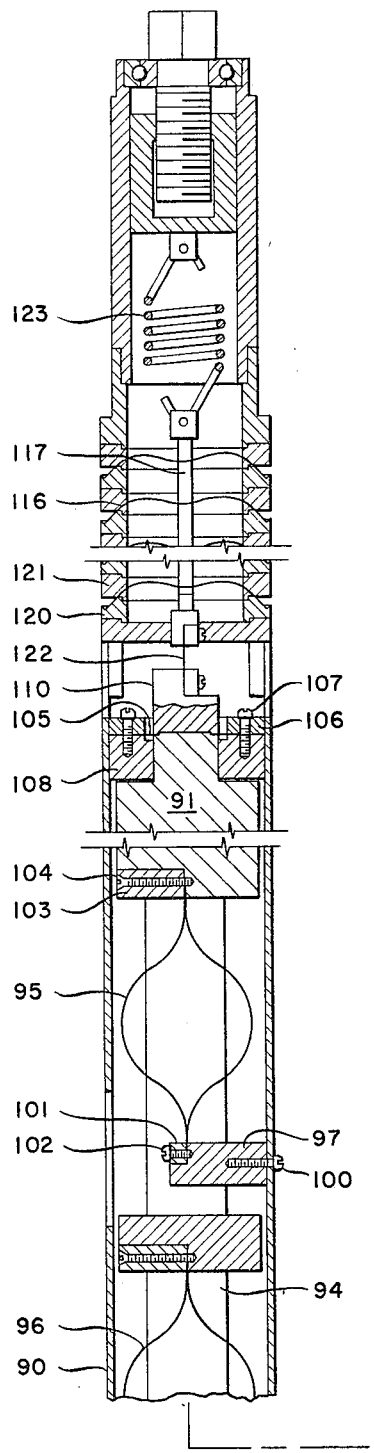
FIGURE 4 is a vertical section of a second embodiment of a seismometer constructed according to this invention and sensitive to vertical motion.
Figure 4:
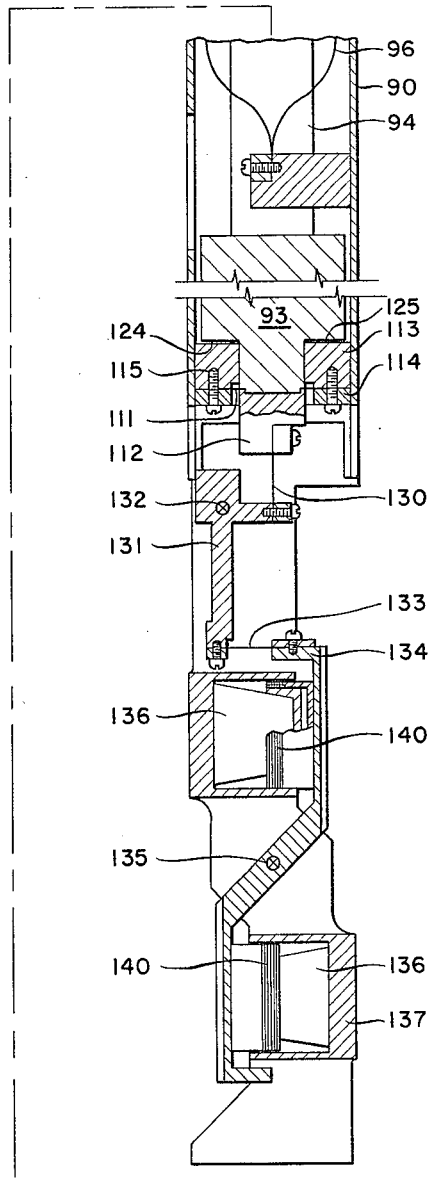

Referring now to FIGURE 4, there is shown a seismometer embodying the features of this invention in a seismometer suitable for detecting vertical motion. The seismometer shown in FIGURE 4 utilizes a tubular outer frame or housing 90. The seismometer has an upper mass 91 and a lower mass 93 that are coupled together by two side arms 94, only one of which is shown in FIGURE 4. The assembly of the two masses is supported by two sets of lift springs 95 and 96. As shown, the lift springs are flat bow springs that are clamped at one end to the mass assembly and at the other end to posts which project radially inward from the outer frame 90. More particularly, the lift spring 95 is clamped at its lower end to a post 97 which projects radially inward from the frame 90. The post 97 is secured to the frame by suitable fastening means, as for example, small machine screw 100. The lower end of the lift spring 95 is clamped to the post by means of a clamping plate 101 which is secured to the post by means of a machine screw 102. The upper end of the lift spring assembly 95 is clamped to the lower surface of the mass 91 by means of the clamping plate 103 and machine screw 104. The lift spring 96 is clamped in a similar manner to both the mass assembly and the main frame 90.

The upper end of the mass assembly is supported by a spider spring 105. The spider spring is a circular spring whose outer edge is clamped securely between an annular ring 108 and a clamping ring 106 with the clamping ring 106 being fastened to the annular ring by means of a plurality of machine screws 107. The annular ring 108 in turn is secured to the outer frame 90 by any suitable means, as for example, small machine screws not shown in FIGURE 4. The inner edge of the spider spring 105 is clamped to the upper surface of the mass 91 by means of an end piece 110 which is fastened to the mass 91 by any suitable means (not shown). For example, the end piece 110 could be fastened to the mass 91 by means of a series of small machine screws. The lower end of the mass assembly is also supported by a spider spring 111. The outer edge of the spider spring 111 is clamped securely between the annular ring 113 and the clamping ring 114, while the inner edge of the spider spring is clamped between the lower end of the mass 93 and the end piece 112. The spider spring 111 is retained in the same manner as explained above for the spider spring 105.

The mass assembly is supported by a plurality of bow-shaped negative springs 116 located at the top of the seismometer assembly. The outer edge of each of the bow springs is secured to an annular ring 120 by any suitable means such as small rivets or the like. Similarly, the center of the bow spring is securely fastened to a supporting rod 117 by any suitable means. For example, each of the bow springs could be provided with a center hole which slides over a center rod, the bow springs being spaced by means of suitable tubular spacers. The outer edges of the bow springs are spaced apart the desired amount by means of a plurality of spacing rings 121. It should be noted that a sufficient number of bow springs 116 having a negative gradient are used to adequately reduce the effective spring gradient of the spring system.

The lower end of the supporting rod 117 is fastened to member 110 by means of a flat spring 122. The ends of the flat spring are clamped to the member 110 and the lower end of the rod 117 by means of clamping plates and small machine screws. The upper end of the rod member 117 is supported by a centering spring 123 which has a construction identical to that described above with respect to the seismometer shown in FIGURE 1.

The centering spring 123 has an adjustment that provides a means whereby the movable mass of the seismometer may be lowered to rigidly support the mass when the seismometer is lowered into a well or the like. For example, in FIGURE 4 when the tension on spring 123 is removed, the surface 124 on the lower mass 93 will rest on the upper surface 125, the annular ring 113. This will insure that the movable portion of the seismometer is supported during the lowering operation. When the seismometer is located in the desired position in the well, the tension can be reapplied to the centering spring 123 to lift the movable mass assembly from the surface 125 and center the coils 140 about the magnets 136.

The lower end member 112 of the lower mass 93 is connected to a bell crank 131 by means of a flat spring 130. Bell crank 131 rotates about a flexure spring pivot 132 whose ends are secured to the frame 90 by suitable means not shown. The lower end of the bell crank 131 is connected by means of a flat spring 133 to a coil frame 134. The coil frame 134 is pivoted at its center about a flexure spring pivot and carries suitable coil forms and coils 140 that are constructed in an identical manner with those shown in FIGURE 1 and described above. Similarly, permanent magnets 136 are mounted in a frame member 137 which extends downwardly from the outer frame 90. The magnets are mounted in substantially the same manner as shown in FIGURE 1.

After the seismometer described above is positioned and the centering spring 123 extended to center the coils 140, the mass will respond to vertical movement to generate a related electrical signal. More particularly, any vertical movement will cause the mass assembly to move with the motion being converted by the bell crank 131 to a horizontal rotational motion of the coil frame 134. This rotation will generate an electrical signal in the coils 140 as they move in the field created by permanent magnets 136. From the above description, it is seen that the movable mass is supported by the spider springs 105 and 111 that are disposed in parallel with the negative bow springs 116. The use of negative spring 116 insures that the seismometer will respond to very low frequency movements on the order of 1 cycle per second. While the centering spring 123 is also in parallel with the negative springs 116 and positive springs 105 and 111 the frequency of spring 123 is higher and thus it does not affect the response of the seismometer.

While two embodiments have been described in detail, modifications and changes can be made. For example, other coil and magnet constructions can be used for the pickup assembly. Likewise, other shapes of masses and movable masses can be used. The important features of this invention are the use of a negative spring in parallel with a positive spring to support the movable mass and the use of flat springs to couple the various movable components of the seismometer to provide low friction supports for the movable masses.

We claim as our invention:
1. A seismic detector comprising:
   a housing;
   a movable mass disposed within the housing;
   a coil system and a permanent magnet, said magnet and coil system being mounted at one end of the housing, one on the housing, the other on the mass, so that movements of the mass move the magnet relative to the coil and induce an electrical signal in the coil;
   a spring system, said spring system being operably connected to said mass to resiliently support said mass at the other end of said housing, said spring system in addition including a negative spring in parallel with a positive spring.
2. The detector of claim 1 wherein said mass is pivoted at one end, and said coil system is mounted on the other end of said mass.
3. The detector of claim 1 wherein said mass is disposed for movement along a first axis, and said coil system is disposed for producing an electrical signal in response to movement along a second axis perpendicular to said first axis;
   said coil system being connected to said mass by a pivoted link.
4. A seismic detector for vertical movements comprising:
   an elongated tubular housing;
   at least one elongated cylindrical mass disposed coaxially within the housing;
   a spider spring having its outer edge secured to the housing and its center secured to said mass;
   a negative spring secured in the housing and adapted to support said mass in opposition to said spider spring;
   a coil assembly having at least one permanent magnet attached to said housing and a movable coil disposed adjacent thereto;
   a bell crank pivotally mounted in said housing, one leg of said bell crank being connected to said mass, the other leg of said bell crank being connected to said movable coil whereby movement of said mass along the axis of said housing will induce an electrical signal in said coil.
5. The seismic detector of claim 4 and, in addition, a centering spring disposed in the housing and connected to said mass to center said coil about said permanent magnet.
6. A seismic detector for horizontal movements comprising:
   an elongated tubular housing;
   at least one elongated mass disposed coaxially within said housing;
   a pair of flat springs disposed with their surfaces perpendicular and intersecting, one end of each flat spring being connected to said elongated mass and the the opposite end of each flat spring being connected to said housing;
   at least one additional flat spring disposed with its surface parallel to the axis of the housing and spaced therefrom, one end of said additional flat spring being connected to said mass, the other end being connected to said housing;
   at least one flat negative spring disposed with its surface parallel to the axis of the housing and spaced therefrom; said negative spring having one end connected to said mass and the other end connected to said housing;
   a coil system having at least one permanent magnet attached to the housing and a movable coil, said coil being attached to said mass.
7. The seismic detector of claim 6 including a centering spring attached to said mass and disposed to center said coil about said magnet.

References Cited by the Examiner

UNITED STATES PATENTS

| | | | |
|---|---|---|---|
| 2,557,080 | 6/1951 | Dawson | 340—17 |
| 2,591,795 | 4/1952 | Eisler | 340—17 |
| 2,681,566 | 6/1954 | Ruge | 73—382 X |
| 3,065,456 | 11/1962 | Alexander | 340—17 |
| 3,194,060 | 7/1965 | Greenwood | 343—17 X |

BENJAMIN A. BORCHELT, *Primary Examiner.*

P. A. SHANLEY, *Assistant Examiner.*